United States Patent Office 2,997,707
Patented Aug. 22, 1961

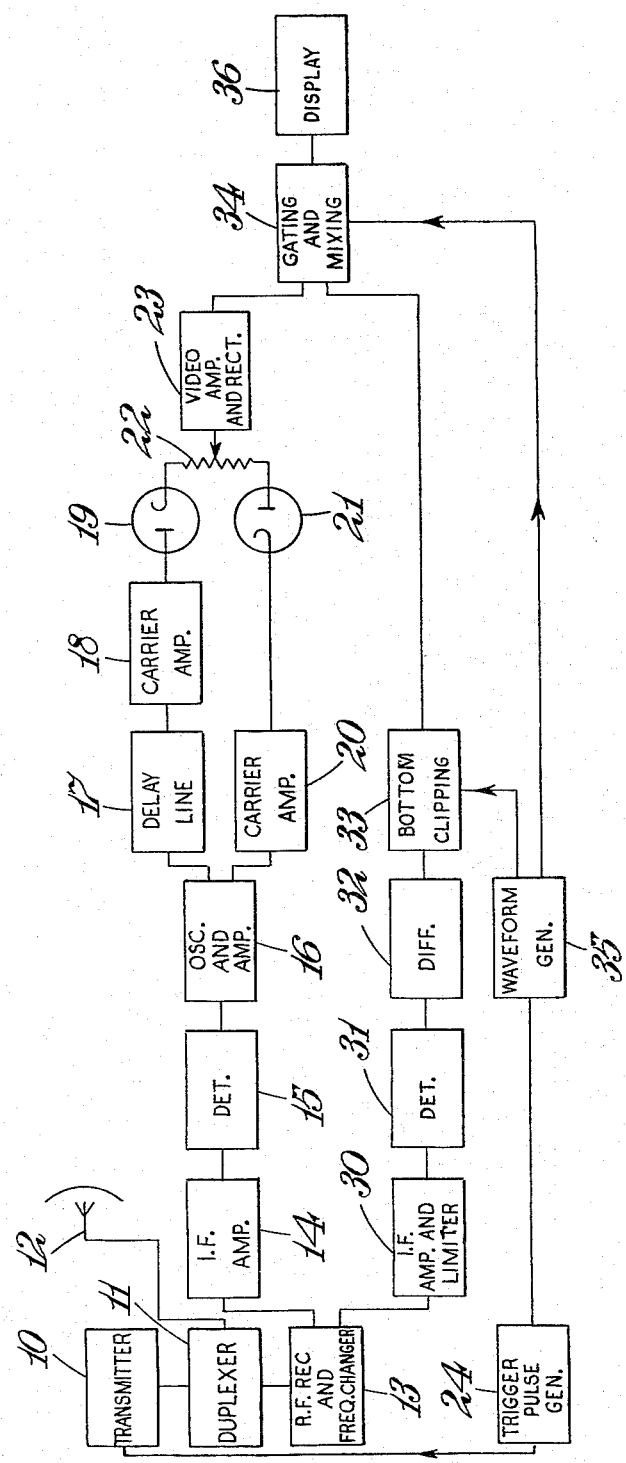

1

2,997,707
MOVING TARGET RADAR APPARATUS
Eric Parker, London, England, assignor to The Decca Record Company Limited, London, England, a British company
Filed Aug. 6, 1956, Ser. No. 602,297
Claims priority, application Great Britain Aug. 11, 1955
6 Claims. (Cl. 343—7.7)

This invention relates to pulse radar apparatus in which an externally-coherent system of moving target indication is employed.

Externally-coherent systems (also known as non-coherent systems) for moving target indication make use of the fact that, when an echo from a moving target is mixed with ground clutter, the amplitude of the echo varies rapidly due to the movement of the target causing variations in the relative phase of the returns from the target and the ground clutter. If echo signals from successive radiated pulses are subtracted (by delaying the one set of signals with respect to the next successive set in a delay line) then a resultant signal will be obtained due to the difference in amplitude between the returns from successive pulses. Such a method of moving target indication has very considerable advantages over other known methods, in particular since it can be used for radar apparatus on a moving vessel without being affected by the movement of that vessel. Furthermore, the apparatus required is very much less complex than internally-coherent methods of moving target indication. However, externally-coherent systems have the drawback that a moving target can be detected only when there is ground clutter; moving targets become lost where there is no ground clutter and thus in general cannot be seen at relatively long distances. It is an object of the present invention to overcome these disadvantages in externally-coherent moving target indicator systems.

According to this invention, radar apparatus comprises a pulse transmitter, a first pulse receiving system for receiving echoes from the transmitted pulses and arranged to provide, by an externally-coherent system, a first set of video signals representative of moving targets, a second receiving system for receiving echoes of pulses from the transmitted pulses which second receiving system has means for partially or wholly suppressing echo signals of long duration and/or large amplitude, and means for displaying together the two sets of video signals. By this arrangement moving targets are distinguished from ground clutter in the manner of known types of externally-coherent moving target indicator systems. In the regions where there is no ground clutter that is, in general, at the longer ranges, all small echo signals will be displayed but any long duration and/or large amplitude echoes will be partially or wholly suppressed. Moving objects, such as ships or aircraft, at the longer ranges will usually only produce quite small echoes compared with those from hills or other natural features. Thus it will be seen that if, for example, there were an aircraft flying over a hill, the first receiving system would provide a signal showing the aircraft distinctly whilst the echo from the hill from the second receiving system would be wholly or partly suppressed and thus in general would not obscure the echo of the aircraft from the first system.

In the second receiving system, the video frequency signals may be "differentiated," for example by passing them through a resistance-capacity or an inductance-resistance circuit having a time constant comparable with the duration of the transmitted pulse so that only the leading edges of any long duration signals will be displayed.

Conveniently the sets of video signals from the two receiving systems are mixed before being fed to an indicator. It will be appreciated that the radar apparatus of the present invention may make use of a plan position indicator or of any other suitable type of display system.

The two receiving systems may employ a common aerial and common radio frequency stages.

The second receiving system, if it is to provide a "differentiated" video output, preferably includes at least one stage having an amplitude-response characteristic arranged to limit at a low level. It will be understood that the first receiving system must not have a limiting receiver and preferably uses a "logarithmic" receiver.

If two sets of video signals are added together, the noise levels are added. However, since with moving target indicator systems it is generally only required to operate at relatively short ranges where strong signals are obtained, this disadvantage may be overcome by "bottom clipping" the video signals from the second receiving system so as to make them noiseless. If the system may be required to operate alternatively with maximum sensitivity at longer ranges (without moving target indication), provision may be made for restoring the video signals from the second system to their normal, i.e. "unclipped," state at these longer ranges. Provision may be made also to reduce or eliminate the contribution from the video signals of the first receiving system for echoes from longer ranges. These two changes with range may occur at different ranges.

The following is a description of one embodiment of the invention, reference being made to the accompanying drawing which is a block diagram of a pulse radar system.

Referring to the drawing, there is shown a pulse transmitter 10 which produces a series of regularly recurring pulses of microwave energy which are fed through a duplexer 11 to an aerial 12. Echoes of these pulses from distant targets are received by the aerial 12 and, after passing through the duplexer 11, are fed to a radio frequency receiver and frequency changer stage 13. The stage 13 provides two separate outputs which are fed respectively to two separate receiving channels referred to hereinafter as the first and second receiving channels. The first receiving channel comprises an intermediate frequency amplifier 14 which has a logarithmic characteristic. The output from the amplifier 14 is rectified in a detector stage 15 and then, as is the usual practice in externally coherent moving target systems, is applied as a modulation to a relatively low frequency carrier, for example 13 or 14 megacycles per second, in an oscillator and amplifier stage 16. Part of the output of this stage is fed through a delay line 17 and amplified by a carrier frequency amplifier 18 before being rectified by a rectifier 19. The output from the rectifier 19 is mixed with an undelayed rectifier output from the amplifier stage 16 obtained by means of a further carrier frequency amplifier 20 and a rectifier 21. The delay line 17, in the known way, has a delay equal to the pulse repetition period of the transmitter and the two rectifiers 19, 21 are of opposite polarity so that corresponding echoes from successive transmitted pulses can be subtractively combined and will tend to cancel one another. The outputs from the two rectifiers 19, 21 are combined in adjustable proportions as indicated diagrammatically by the potentiometer 22 and then fed to a video amplifier 23 which includes a full-wave rectifier since the combined output from the rectifiers 19, 21 might be of either polarity. Echoes from static targets remain at the same range and will generally be of constant amplitude so that effective cancellation may be obtained. Echoes from moving targets will tend to beat in amplitude if the target echo is in ground clutter and hence will in general give a video signal at the amplifier 23. Where there is no ground clutter, there may however be no output from this receiving system.

In accordance with known practice for externally coherent moving target indicating radar systems, to ensure that the delay line 17 has a delay period exactly equal to the period between successive radiated pulses, the transmitter pulse repetition rate may be controlled by a delay line. For example a trigger pulse generator 24 may be provided for controlling the transmitter 10, which trigger pulse generator includes a further delay line which is adjustable so that it can be set to have the same delay as the line 17 and which is kept closely adjacent the line 17 in a thermostatically controlled oven, thereby ensuring that the interval between successive trigger pulses is equal to the delay period produced by the line 17.

The second output from the radio frequency receiver and frequency changer stage 13 is applied to the second receiving channel which comprises an intermediate frequency amplifier 30 including at least one stage which limits at a relatively low level. The output from the amplifier 30 is detected by a rectifier stage 31 to produce video signals which are applied to a short time-constant differentiating circuit 32 having a time constant comparable with the duration of the transmitted pulse, so that only the leading edges (about a pulse length in duration) of any received clutter signals will be displayed while isolated echoes will be displayed almost unchanged. The output from the differentiating circuit 32 is fed through a bottom clipping circuit 33 which is arranged to clip the bottom of the video signals so as to remove any noise, and the signals are then fed into the gating and mixing circuit 34.

The gating and mixing circuit 34 is controlled by a wave form generator 35 which is arranged to produce the gating signals in synchronism with the output from the trigger pulse generator 24 and which control the two inputs to the circuit 34 so that only signals from the video amplifier 23 corresponding to relatively short range echoes are fed through the gating circuit 34 to a display unit 36 whilst signals covering the whole of the required display range are fed from the second receiving channel to this same display. There need not be a sharp cut-off with range of the signals from the first receiving channel as the waveform generator 35 can be arranged to produce a gating waveform to give a gradual change of gain with range in a similar manner to radar swept-gain controls. The waveform generator 35 is also arranged to control the bottom clipping circuit so that the signals are only clipped over shorter ranges where mixing with signals from the first receiving channel occurs. At longer ranges the signals are preferably unclipped to ensure maximum sensitivity.

It will be seen that the arrangement just described will serve at short ranges to display moving targets and that, due to the differentiating circuit 32, these moving targets will not be obscured by ground clutter. At longer ranges, where moving targets may not be detected by the first receiving system due to absence of any ground clutter, signals will be detected and displayed in the normal manner by the second receiving system.

I claim:

1. Pulse radar apparatus comprising a pulse transmitter arranged to produce short duration pulses of radio frequency energy, an aerial coupled to said transmitter to radiate said short duration pulses and to receive echoes of the radiated pulses from distant targets, a non-coherent moving target receiving system coupled to said aerial including delay means for delaying the received signals and combining means for combining the delayed signals with undelayed signals to cancel responses from static targets and thereby to produce, from the received echoes, a first set of video signals representative of moving targets, a second receiving system including an amplitude limiter coupled to said aerial to produce a second set of video signals representative of said distant targets, differentiating circuit means for differentiating said second set of video signals to produce video output signals in which long duration signals of said second set are suppressed except for their leading edges, and display means for displaying together said first set of video signals and the differentiated signals from said differentiating circuit means.

2. Pulse radar apparatus comprising a pulse transmitter arranged to produce short duration pulses of radio frequency energy, an aerial coupled to said transmitter to radiate said short duration pulses and to receive echoes of the radiated pulses from distant targets, a non-coherent moving target receiving system coupled to said aerial including delay means means for delaying the received signals and combining means for combining the delayed signals with undelayed signals to cancel responses from static targets and thereby to produce, from the received echoes, a first set of video signals representative of moving targets, a second receiving system including an amplitude limiter coupled to said aerial to produce a second set of video signals representative of said distant targets, differentiating circuit means for differentiating said second set of video signals to produce video output signals in which long duration signals of said second set are suppressed except for their leading edges, a bottom clipping circuit for removing noise from said differentiated signals, a mixer for combining the output from said bottom clipping circuit with said first set of video signals, and an indicator for displaying the combined output signals from said mixer.

3. Pulse radar apparatus comprising a pulse transmitter arranged to produce short duration pulses of radio frequency energy, an aerial coupled to said transmitter to radiate said short duration pulses and to receive echoes of the radiated pulses from distant targets, a non-coherent moving target receiving system coupled to said aerial including delay means for delaying the received signals and combining means for combining the delayed signals with undelayed signals to cancel responses from static targets and thereby to produce, from the received echoes, a first set of video signals representative of moving targets, a second receiving system including an amplitude limiter coupled to said aerial to produce a second set of video signals representative of said distant targets, differentiating circuit means for differentiating said second set of video signals to produce video output signals in which long duration signals of said second set are suppressed except for their leading edges, a bottom clipping circuit for removing noise from said differentiated signals for echoes from relatively close targets while leaving unclipped echoes from longer ranges, a mixer for combining the output from said bottom clipping circuit with said first set of video signals, and an indicator for displaying the combined output signals from said mixer.

4. In pulse radar apparatus having a pulse transmitter arranged to produce short duration repetitive pulses of radio frequency energy, a radio frequency receiver, an aerial and a duplexer for connecting said receiver to said aerial in the intervals between the transmitted pulses to produce a radio frequency output of echo signals from distant targets; the combination of a frequency changer stage to convert said radio frequency output into intermediate frequency signals, a first intermediate frequency amplifier and detector system coupled to said frequency changer stage to amplify and detect said intermediate frequency signals, a carrier oscillator, a modulator for applying the output of said amplifier and detector to the output of said oscillator to modulate that output, a delay line for delaying part of the modulated output for a period equal to the interval between successive transmitted pulses, a first rectifier for rectifying the delayed signals, a second rectifier for rectifying undelayed signals from said modulator, a mixer for combining the outputs of said first and second rectifier in opposition, a video amplifier and detector for amplifying and detecting the output from said mixer, a second intermediate frequency amplifier and detector system coupled to said frequency changer stage to amplify and detect said intermediate frequency signals, a differentiating circuit coupled to said second intermediate frequency amplifier and detector stage to produce a differentiated video signal and display means for displaying together the video frequency outputs of said video frequency amplifier and detector and said differentiating circuit.

5. The combination claimed in claim 4 wherein said second intermediate frequency amplifier and detector includes a limiter for limiting the output.

6. The combination as claimed in claim 5 wherein a bottom clipping circuit is provided for removing the noise from the output of said differentiating circuit over at least the period following each transmitter pulse corresponding to shorter range signals.

References Cited in the file of this patent
UNITED STATES PATENTS 2,597,636    Hall ------------------ May 20, 1952

OTHER REFERENCES

Radar System Engineering by Ridenour (Radiation Laboratory Series), published by McGraw-Hill Book Co. Inc., 1947, p. 657 relied on.